United States Patent [19] [11] 3,988,406
Nakamura et al. [45] Oct. 26, 1976

[54] METHOD OF PROVIDING A FIBROUS THERMOPLASTIC RESIN FOR DEPOLYMERIZATION THEREOF

[75] Inventors: Masafumi Nakamura; Tadahiro Fujii; Hiromi Nagashima; Hiroshi Henmi, all of Nobeoka, Japan

[73] Assignee: Asahi Kasei Kogyo Kabushiki Kaisha, Osaka, Japan

[22] Filed: Mar. 24, 1975

[21] Appl. No.: 561,627

Related U.S. Application Data

[63] Continuation of Ser. No. 349,462, April 9, 1973, abandoned.

[30] Foreign Application Priority Data

Apr. 13, 1972   Japan.............................. 47-36243

[52] U.S. Cl.................................. 264/68; 264/37; 264/118; 264/142; 264/143; 264/176 F; 264/238; 526/914
[51] Int. Cl.$^2$...................... C08F 8/50; B29C 25/00
[58] Field of Search .............. 264/37, 68, 118, 140, 264/141, 142, 143, 123, 124, 174, 176, 238, DIG. 69; 260/94.7 D, 96 D; 526/13, 914

[56] References Cited
UNITED STATES PATENTS

| | | | |
|---|---|---|---|
| 2,028,240 | 1/1936 | Palmer............................. | 264/68 X |
| 2,433,727 | 12/1947 | Arnold............................ | 264/140 X |
| 2,779,974 | 2/1957 | Billing............................ | 264/123 X |
| 3,227,703 | 1/1966 | Copenhaven.................. | 260/94.7 D |
| 3,287,480 | 11/1966 | Wechsler....................... | 264/118 X |
| 3,444,155 | 5/1969 | Fish ............................... | 260/94.7 D |

*Primary Examiner*—Robert F. White
*Assistant Examiner*—Thomas P. Pavelko
*Attorney, Agent, or Firm*—Armstrong, Nikaido & Wegner

[57] ABSTRACT

A method of providing a fibrous thermoplastic resin for depolymerization thereof wherein the fibrous thermoplastic resin is formed into a shaped article having a specific gravity of at least ½ of the true specific gravity of the fibrous thermoplastic resin, said shaped article consisting of the fibrous thermoplastic resin mass having on its surface a crusty thin resin layer which may be press-bonded or melt-bonded to the mass. The thus provided shaped article of the fibrous thermoplastic resin can be advantageously employed as a starting material for the depolymerization reaction. In accordance with this invention, the time required for completion of the depolymerization can be greatly shortened as compared with that of the conventional technique and the rate and efficiency of the depolymerization can be greatly improved. Further, according to this invention, fibrous thermoplastic resins can be depolymerized effectively on an industrial scale while automatically conducting unit-operations such as storing, transportation, weighing, and charging into a reaction vessel in much simplified manners.

9 Claims, 5 Drawing Figures

METHOD OF PROVIDING A FIBROUS THERMOPLASTIC RESIN FOR DEPOLYMERIZATION THEREOF

This application is a continuation application of Ser. No. 349,462, filed Apr. 9, 1973, now abandoned.

This invention relates to an improvement in the depolymerization of fibrous thermoplastic resins.

More particularly, this invention is concerned a method of providing a fibrous thermoplastic resin for depolymerization thereof, wherein the fibrous thermoplastic resin is provided in a greatly improved form as a starting material for the depolymerization.

In the synthetic fiber industry, it is of great industrial significance to recover raw materials by depolymerizing fibrous thermoplastic resins. During the spinning, drawing and twisting steps in the production of synthetic fibers, yarn scrap or fibrous scrap is formed in an amount corresponding to about 10% of yarn outputs, and discard of such yarn scrap not only invites economical disadvantages but also brings about the problem of environmental pollution. Accordingly, many processes have been proposed and practised to regenerate such yarn scrap. However, there has not been developed as yet a technique of conducting the depolymerization reaction advantageously, and in the conventional techniques, the overall efficiency of the regeneration and recovery process and the economical advantage are extremely low.

Further, investigations are still required to be made on the low bulk density and the form disorder in yarn scrap to be treated. More specifically, in case yarn scrap having a low bulk density and a disordered form are used directly as a starting material for the depolymerization reaction, large space is necessary for storing such starting material, and the transportation and the charging into a reaction vessel involve various troubles. Furthermore, scattering of yarn scrap does harm to the health of workers, and the size of a weighing device used in feeding such fibrous scrap should be made greater and continouous operation becomes difficult. Still further, in case an explosive gas is present in the reaction vessel, air accompanying the fibrous scrap should be replaced by an inert gas for preventing occurrence of an electrostatic explosion, resulting in that the size of the equipment should inevitably be increased and the equipment efficiency is lowered. Moreover, since the amount of such starting material charged to the reaction vessel is small, the efficiency of the reaction vessel is reduced. Because of the foregoing disadvantages and difficulties, expenses for construction and operation of the recovery process are considerably great and good conditions cannot be attained in the working environment.

A method comprising forming chips by re-melting the yarn scrap may be considered as means for overcoming these defects. According to this re-melting method, however, surface areas of the resulting chips are small, and therefore, an extremely long time is required for completion of the depolymerization reaction. In addition, since resins are frequently exposed to temperatures higher than their melting point, side decomposition reactions tend to occur, resulting in another defect of reduction of the starting material recovery. Still in addition, the loss of heat consumed for re-melting is great and cannot be neglected. For these reasons, this method also cannot be said to be a good method.

Extensive and intensive studies have been made with a view to developing a process for depolymerization of yarn scrap in which the foregoing defects of the conventional techniques can be fully overcome and useful raw materials can be recovered from the yarn scrap with high efficiency and great economical advantages.

Essentially, according to this invention, there is provided a method of providing a fibrous thermoplastic resin for depolymerization thereof wherein the fibrous thermoplastic resin is formed into a shaped article having a specific gravity of at least ½ of the true specific gravity of the resin, said shaped article consisting of the fibrous thermoplastic resin mass having on its surface a crusty thin layer which is bonded to the mass. The thus formed shaped article of the fibrous thermoplastic resin can be advantageously used as a starting material for the depolymerization reaction.

Accordingly, it is a primary object of the present invention to provide a method of providing a fibrous thermoplastic resin for depolymerization thereof wherein the fibrous thermoplastic resin is provided in an improved form as a starting material for the depolymerization.

The foregoing and other objects, features and advantages of the present invention will be apparent to those skilled in the art from the following detailed description taken in connection with the accompanying drawing in which.

Figure 1:
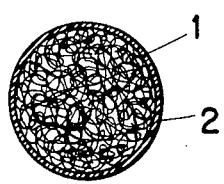
FIG. 1 is a diagrammatic cross section of a cylindrically shaped article produced according to the present invention.

The essential feature of this invention resides in that a fibrous thermoplastic resin is formed in a specific shaped article and this shaped article is subjected to the depolymerization reaction, and by dint of this essential feature this invention succeeds in overcoming the defects and difficulties involved in the conventional techniques. This shaped article will now be described more in detail.

The material constituting the shaped article of this invention is a fibrous thermoplastic resin. By the term "fibrous thermoplastic resin" are meant filaments and staple fibers which are usually called synthetic fibers. Examples of such synthetic fibers are those of polyesters, polyamides, polyester amides, polypropylene, polyethylene, polyurethanes or copolymers or mixtures thereof. Of course, filaments cut in the staple fiber-like form may be used in this invention.

The shaped article can take any of cylindrical, spherical, egg-like, cubic, rectangular parallelopiped, disc-like and coin-like shapes and other various forms. In short, as long as the shaped article has the specific physical characteristics and structure detailed hereinafter, its form is not particularly critical. Accordingly, the shaped article of this invention has an optional form in section, but from a view point of handling easiness, for instance, easiness in storing, weighing and charging into the reaction vessel, and of easiness in reaction operations such as agitation operation, it is preferred that the size of the shaped article is adjusted to about 200 mm or smaller expressed in the maximum length.

As important physical factors of the shaped article produced according to this invention, there can be mentioned the specific gravity, surface hardness and strength.

It is indispensable to the method of this invention that the specific gravity of the shaped article of this invention be at least ½ of the true specific gravity of the resin. In case the specific gravity is too small, the resin mass takes a cotton-like form and has a great bulk, and therefore, a large space is required for storing. Further, when a shaped article is prepared from such too small density resin, it is likely to crumble and, in addition, storing, weighing, charging and other operations become difficult. Therefore, the fibrous thermoplastic resin is advantageously formed into a shaped article by passing it through a compression zone. In the interior of the shaped article of this invention, filaments or fibers are present in their original form and air and other gases are contained in the interior. Accordingly, the specific gravity of the shaped article of this invention is naturally lower than the true specific gravity of the resin.

It is preferred that the shaped article of this invention has a surface hardness of from 15 to 60 in terms of the Shore hardness. In case the surface hardness is lower than a Shore hardness of 15, the shaped article is likely to crumble into pieces. In contrast, when the surface hardness exceeds a Shore hardness of 60, the thickness of the surface crusty resin layer is too great and a long time is required for completing the depolymerization reaction.

It is desired that in order to prevent the shaped article from crumbling into pieces during operations, the shaped article has a strength of at least 10 g/mm$^2$ in terms of a breaking strength. The strength varies depending on the configuration of the shaped article, the physical properties of the substrate yarn, the orientation among individual yarns, the thickness of the surface crusty thin layer and the like, and even when the strength of the shaped article is partially or locally less than the above value, there are not brought about any particular disadvantages, as long as the shaped article as a whole has such a strength as will prevent crumbling.

The structure of the shaped article of this invention is a very important factor for attaining the effects intended in this invention.

At the outset, the interior structure of the shaped article of this invention will be explained.

In the interior of the shaped article, the fibrous thermoplastic resin retains the original form. Stated more particularly, the internal fibrous thermoplastic resin is advantageously, of a form of the compressed fiber mass. Accordingly, disposition of the fibrous thermoplastic resin is optional. It may be regularly disposed or may be randomly disposed. In general, the fibrous thermoplastic resin is present in the interior of the shaped article in such state that individual filaments or fibers are entangled with one another. Further, since the fibrous thermoplastic resin is present in the original form in the interior of the shaped article, air and other gases are included therein. Since the shaped article according to the present invention has such interior structure, the time required for depolymerization can be greatly shortened. This is one of great effects attained by this invention. In case the fibrous thermoplastic resin is re-molten and pelletized and is then subjected to the depolymerization reaction, the reaction cannot but advance gradually from the surface to the interior and therefore, a long time is inevitably required for completion of the reaction. In contrast, in case of the shaped article of this invention, after the reaction is completed in the surface crusty thin layer portion and the surface resin layer is broken, the reaction advances rapidly into the interior portion because the interior has a large reaction area and takes a fibrous form in which the reaction proceeds very easily. Accordingly, the depolymerization reaction is completed in a short period of time very smoothly.

The surface structure of the shaped article of this invention will now be illustrated.

As described above, the industrial value of the entire process for regeneration and recovery of fibrous thermoplastic resins has been very low because sufficient device or improvement has not been developed as to the form or structure which such fibrous thermoplastic resins to be subjected to depolymerization should possess. As also stated hereinbelow, poor advance of investigation or research in such field is mainly due to the high bulkiness, form disorder and easily crumbling property of fibrous thermoplastic resins. In order to improve such shortcomings of the fibrous thermoplastic resin, according to the present invention, the surface portion of the shaped article to be subjected to depolymerization is formed in a thin layer composed of the same resin as the fibrous thermoplastic resin or the other resin having affinity to the fibrous thermoplastic resin.

The thickness of this crusty resin layer should be determined to satisfy the following two requirements; namely, the shaped article has such a high strength as will not cause crumbling of the shaped article and the thickness of the crusty layer is not so great as will not prolong the time required for completion of the depolymerization reaction. In view of the first requirement, it is desired that the surface crusty thin resin layer has a thickness of more than 0.05 mm, preferably more than 0.1 mm, and in view of the second requirement it is desired that the surface crusty thin resin layer has a thickness of less than 3 mm, preferably less than 2 mm.

Such uniformity as required in ordinary films is not at all required in the surface crusty thin resin layer of the shaped article of this invention. No disadvantages are brought about when the thickness of the crusty resin layer differs partially or locally, and as long as the shaped article has a certain strength, even the presence of cracks in the surface crusty thin resin layer can be neglected. This means that in case the shaped article has a form of a cylinder or the like, a part or all of the upper or bottom portion of the shaped article may not possess a surface crusty thin resin layer.

Figure 3:
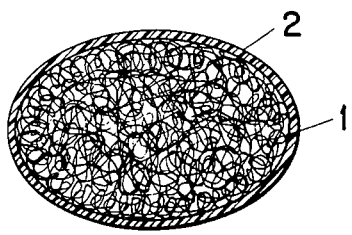
FIG. 3 is a diagrammatic cross section of an egglike-shaped article produced according to the present invention.
Figure 2:
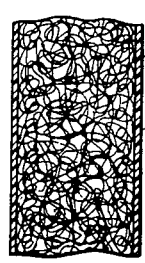
FIG. 2 is a diagrammatic longitudinal section of the shaped article shown in FIG. 1.

The foregoing structure of the shaped article of this invention is illustratively explained by referring to FIGS. 1 to 3. In FIGS. 1 to 3, numerals 1 and 2 indicate a fibrous thermoplastic resin and a thermoplastic crusty thin resin layer, respectively.

As the method for forming a shaped article of this invention, namely a fibrous thermoplastic resin mass having a surface crusty thin resin layer, there may be mentioned, for example, a method comprising coating the surface of a fibrous thermoplastic resin mass with a melt of the same resin and solidifying the coated melt by cooling; a method comprising heating the surface of a fibrous thermoplastic resin mass by a suitable heat source, melting the surface portion and solidifying it by cooling; a method comprising melting the surface portion of a fibrous thermoplastic resin mass by friction heat generated by friction between the surface portion and other substance and solidifying the molten portion by cooling; and a method comprising elevating the temperature of the surface portion of a fibrous thermoplastic resin mass to above the glass transition temperature, preferably above the softening point, by friction heat generated by friction between the surface portion and other substance and simultaneously applying a pressure to the resin mass, to thereby pressure-bond filaments or fibers on the surface portion of the fibrous resin mass and form a crusty thin resin layer on the surface portion of the fibrous thermoplastic resin mass. A most appropriate method may be chosen among these methods in view of other conditions.

In practising the process of this invention, in some kinds of fibrous thermoplastic resins, better results are sometimes obtainable when such a pre-treatment as described below is conducted.

For example, in the case of polyester filaments, yarn scrap formed during the drawing and twisting step has an oiling agent adhering thereto, and their form is drastically disordered and their length is difficult to handle (yarn scrap has a form resembling a horse tail). Accordingly, prior to depolymerization, this yarn scrap is cut into a length of 0.5 to 150 mm, preferably 10 to 50 mm, by means of a cutter constructed by modifying a customary grinder and the so cut yarn scrap is automatically forwarded to a washing zone by pneumatic transportation or slurry transportation. As is well known in the art, if the applied oiling agent is not removed sufficiently from yarn scrap, the oiling agent is incorporated in recovered ethylene glycol and it is very difficult to remove it from the recovered ethylene glycol, resulting in that re-use of the recovered ethylene glycol becomes impossible. In other words, use of ethylene glycol incorporated with an oiling agent causes coloration in resulting polyethylene terephthalate yarns. For this reason, the use of oiling agent-incorporated ethylene glycol should be avoided.

Figure 4:
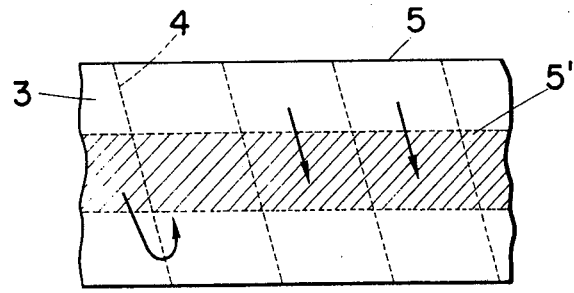
FIG. 4 is a diagrammatic section of a featuristic portion of a washing machine which may advantageously be used for washing fibrous scrap stained with oil.

At the washing step, the cut yarn scrap is washed with a detergent comprising a surfactant or the like, preferably by employing a specific washing machine having a spiral flow passage, which has been devised by us. (Japanese patent application No. 41731/1972). Such washing machine is diagrammatically shown in FIG. 4. Numeral 5' designates an inner cylinder disposed in a flow tube 5. A guide barrier 4 is spirally provided on an inner wall of the flow tube 5. A mixture 3 of, for example, a cotton-like polyester fibers and a detergent is introduced into the flow tube and flown spirally according to the guide barrier 4. Thus, effective washing of the oil-stained fibrous materials can be attained. Then, the detergent is removed on a net conveyor and the dehydration is accomplished by means of a centrifugal dehydrator. Then, the washed yarn scrap is dried by a drier until the water content is reduced below 5% (on the dry basis), preferably below 2%. Then, the yarn scrap is molded according to this invention. In case such pretreatment is effected, the depolymerization can be accomplished with great industrial advantages. In this case, the yarn scrap after the drying operation has a bulk density of about 0.03. Among the above-mentioned shaping methods, the method comprising elevating the temperature of the surface portion of a cylindrical mass of the fibrous thermoplastic resin to above the glass transition point by utilizing friction heat generated by friction of the resin mass and other substance, preferably by extruding the resin mass from a cylindrical die (Japanese utility model registration application No. 49104/1972. See, Example 1), to thereby form a shaped article in which the surface crusty thin resin layer is formed and is pressure-bonded, is preferably employed for shaping of yarn scrap.

This invention will now be illustrated more in detail by reference to Examples and Comparative Examples.

EXAMPLE 1

Figure 5:
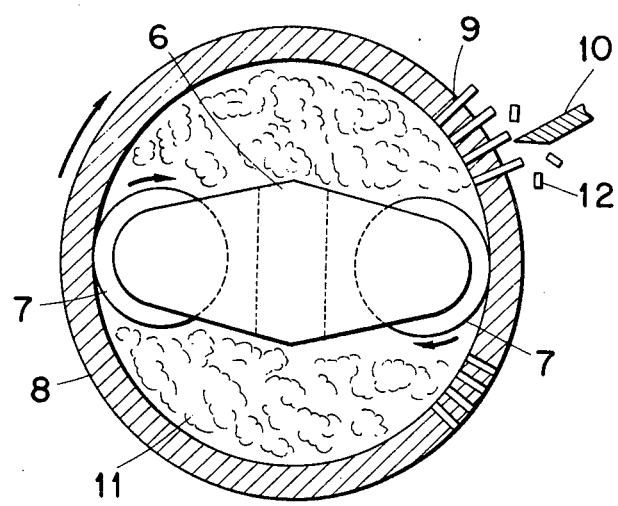
FIG. 5 is a diagrammatic cross section of a molding machine which may advantageously be employed for producing the shaped article shown in FIGS. 1 and 2.

Explanation is made referring to FIG. 5. In a cylinder 8 having an inner diameter of 500 mm, an outer diameter of 600 mm and a thickness of 100 mm, penetrating openings 9 having a length of 8 mm and a diameter of 6 mm are provided at a pitch of 10 mm in the radial direction. This cylinder is rotated at a rate of 150 rpm. Rollers 7, 7 having a diameter of 200 mm and a width of 100 mm are attached to both sides of a fixed shaft 6 provided in the interior of this cylinder. The rollers 7, 7 are caused to rotate in such a manner that the rollers are contacted with the cylinder and are driven and rotated with the rotation of the cylinder. Since a wedge-like space is formed between the rotating cylinder and rollers disposed in the cylinder, a polyethylene terephthalate yarn scrap 11 having a bulk density of about 0.03 is continuously fed into this space. The yarn scrap is crushed between the cylinder and roller and a cylindrically shaped article 12 such as shown in FIGS. 1 and 2 is continuously extruded from the peripheral surface of the cylinder and cut by a knife 10. This cylindrical shaped article 12 of the fibrous polyethylene terephthalate has a diameter of 6 mm, a length of 30 mm, a specific gravity of 1.1 (the true specific gravity of the polyester being 1.39), a surface crusty thin resin layer thickness of 0.1 mm, a breaking strength of 38 g/mm$^2$ and a surface Shore hardness of 46. 2000 Kg of the so obtained polyethylene terephthalate shaped article is charged in a reaction vessel having a capacity of 8 m$^3$, and 3000 Kg of ethylene glycol and 40 Kg of manganese acetate as a catalyst are further charged in the reaction vessel, and the depolymerization reaction is conducted. The reaction temperature is maintained at the boiling point of the reaction mixture. It takes 20 minutes for the shaped article to disappear completely. The shaped article is automatically charged to the reaction vessel from a completely nitrogen-replaced hopper through an impact type weighing device.

COMPARATIVE EXAMPLE 1

A polyethylene terephthalate yarn scrap is charged into the same reaction vessel having a capacity of 8 m$^3$ as used in Example 1 by human power without shaping the yarn scrap. The charging requires a very heavy labor and since the nitrogen replacement is insufficient, there is a fear of an electrostatic explosion, and the operation is very difficult. When about 200 Kg of the yarn scrap is charged in the reaction vessel, the vessel is almost full of the yarn scrap, and hence, the efficiency of utilization of the reaction vessel is extremely low.

COMPARATIVE EXAMPLE 2

Small pieces of polyethylene terephthalate obtained by melting a cylindrical polyethylene terephthalate having a diameter of 6 mm and a length of 30 mm completely even up to the interior thereof are charged in an amount of 2000 Kg in the same reaction vessel as used in Example 1, and 3000 Kg of ethylene glycol and 40 Kg of the same catalyst as used in Example 1 are further charged into the reaction vessel, and the depolymerization reaction is carried out under the same conditions as adopted in Example 1. It takes 2 hours and 45 minutes for the polyethylene terephthalate shaped article to disappear completely.

EXAMPLE 2

A cotton-like yarn scrap of polyhexamethylene adipamide having a bulk density of about 0.03 is deposited on a horizontally transporting lattice conveyor having a width of 1 m and a horizontal length of 2 m and is horizontally forwarded, and is lifted about 2 m by means of an elevating lattice conveyor having an angle of 70° from the horizontal surface, which is provided at the outlet end of the above horizontally transporting lattice conveyor. Then, the yarn scrap transported by the elevating lattice conveyor is swept off from the lattice. At this time, the yarn scrap is allowed to fall down in the form resembling a large snow flake. The falling yarn scrap is received on the inlet end of a steel belt of a width of 1.4 m and a horizontal length of 15 m without overlapping. The steel belt carrying the yarn scrap in the form resembling a large snow flake is introduced into a tunnel-like box which is heat-insulated and has a length of 13 m. The running speed of the steel belt is adjusted to 1 m/min. In the box, hot air maintained at about 300° C. is flown on the lower and upper surfaces of the belt in the same direction as the moving direction of the belt, whereby the yarn scrap having a form resembling a large snow flake is heated and compressed to have an increased bulk density. Simultaneously, the surface portion of the snow flake-like yarn scrap is molten to form a crusty thin resin layer. Just after the so heated yarn scrap has passed through this box, it is scraped off from the steel belt by means of a scraper. Then, the yarn scrap is laden on a net conveyor and cooled with water. In the foregoing manner, a shaped article having an egg-like form, such as shown in FIG. 3, is continuously obtained.

The so formed shaped article of polyhexamethylene adipamide has an egg-like form of a long axis of 15 mm and a short axis of 10 mm, and has a specific gravity of 0.8, a surface crusty thin resin layer thickness of 0.3 mm, a breaking strength of 25 g/mm$^2$ and a surface Shore hardness of 34. This shaped article is charged in an amount of 250 g into a reaction vessel having a capacity of 4 liters, and 600 g of water and 100 g of sodium hydroxide are further charged into the reaction vessel, and the hydrolysis reaction is carried out at 190° C. The handling of the shaped article is very easy, and in the above reaction it takes only 20 minutes for the shaped article to disappear completely.

COMPARATIVE EXAMPLE 3

Polyhexamethylene adipamide small pieces having the same configuration and size as those of the shaped article obtained in Example 2, which have been prepared by melting polyethylene adipamide completely up to the interior thereof and solidifying it, are treated in the same manner as in Example 2. As a result, it takes 3 hours for the small pieces to disappear completely.

EXAMPLE 3

1.5 Kg of a cylindrically shaped article of poly-ε-caprolactam having a diameter of 10 mm, a length of 20 mm, a specific gravity of 0.7, a crusty thin resin layer thickness of 0.2 mm, a breaking strength of 20 g/mm$^2$ and a surface Shore hardness of 32 is charged in a reaction vessel having a capacity of 5 liters, and phosphoric acid is charged as a catalyst in an amount of 0.1% by weight based on the polymer into the reaction vessel. The depolymerization reaction is carried out by blowing superheated steam of 370° C. into the reaction vessel. It takes 15 minutes for the shaped article to disappear completely.

COMPARATIVE EXAMPLE 4

Small pieces of poly-ε-caprolactam which have been molten completely up to the interior thereof and solidified are depolymerized in the same manner as in Example 3. It takes 1 hour for the small pieces to disappear completely.

As is apparent from the foregoing description, according to this invention, since the starting material for the depolymerization reaction having a fibrous form is shaped into a solid-like form which can be easily handled, such processes as storing, transportation, weighing, inert gas replacement and charging into a reaction vessel can be simplified on an industrial scale and it is made possible to conduct these processes automatically on an industrial scale with economical advantages. Further, the weight of the shaped article charged into a reaction vessel is about 30 times as great as in the case of the fibrous resin, and the time required for completion of the depolymerization reaction can be greatly shortened. Thus, this invention solves various problems involved in the conventional techniques for the depolymerization of fibrous thermoplastic resins and hence, this invention makes great contributions to the art.

What is claimed is:

1. A method of depolymerizing a fibrous thermoplastic resin, comprising
   A. compressing a fibrous thermoplastic resin mass by extrusion and, while compressing and during extrusion, melting only the surface portion of the mass,
   B. cooling the mass to solidify the molten surface portion, thereby forming a shaped article having a specific gravity greater than ½ of the true specific gravity of the resin, said shaped article consisting of the fibrous thermoplastic resin mass having on its surface a crusty thin resin layer bonded to the resin mass,
   C. cutting the shaped article into sections, and
   D. introducing the resulting cut shaped article into a depolymerization chamber, wherein said article is subjected to heat depolymerization.

2. A method according to claim 1 wherein said crusty thin resin layer is formed by melting the surface portion of the fibrous thermoplastic resin by friction heat generated during extrusion.

3. A method according to claim 1 wherein said crusty thin layer has a Shore hardness of from 15 to 60 and a breaking strength of at least 10 g/mm$^2$.

4. A method according to claim 1 wherein the fibrous thermoplastic resin is a polyester fiber.

5. A method according to claim 1 wherein the fibrous thermoplastic resin is a polyamide fiber.

6. A method according to claim 4 wherein the polyester fiber is a polyester yarn scrap and prior to the shaping, it is cut into short fibers and is then washed with a detergent, water-washed, dehydrated and dried.

7. A method according to claim 1 wherein said crusty thin resin layer has a thickness of 0.05 to 3 mm.

8. A method of depolymerizing a fibrous thermoplastic resin, comprising
 A. compressing a fibrous thermoplastic resin mass by extrusion and, while compressing and during extrusion, elevating only the surface portion of the mass to a temperature above the glass transition point,
 B. cooling the mass to solidify the softened surface portion, thereby forming a shaped article having a specific gravity greaer than ½ of the true specific gravity of the resin, said shaped article consisting of the fibrous thermoplastic resin mas having on its surface a crusty thin resin layer bonded to the resin mass,
 C. cutting the shaped article into sections, and
 D. introducing the resulting cut shaped article into a depolymerization chamber, wherein said article is subjected to heat depolymerization.

9. The method according to claim 8 wherein the temperature is elevated by friction heat generated during extrusion.

* * * * *